(12) United States Patent
Baumgaertner

(10) Patent No.: US 10,479,442 B2
(45) Date of Patent: Nov. 19, 2019

(54) VEHICLE HAVING AN ELECTRIC DRIVE, IN PARTICULAR AN ELECTRICAL BICYCLE, AND METHOD FOR OPERATING SUCH A VEHICLE

(71) Applicant: Robert Bosch GmbH, Stuttgart (DE)

(72) Inventor: Daniel Baumgaertner, Tübingen (DE)

(73) Assignee: Robert Bosch GmbH, Stuttgart (DE)

(*) Notice: Subject to any disclaimer, the term of this patent is extended or adjusted under 35 U.S.C. 154(b) by 248 days.

(21) Appl. No.: 15/529,446

(22) PCT Filed: Sep. 21, 2015

(86) PCT No.: PCT/EP2015/071593
§ 371 (c)(1),
(2) Date: May 24, 2017

(87) PCT Pub. No.: WO2016/082962
PCT Pub. Date: Jun. 2, 2016

(65) Prior Publication Data
US 2017/0320540 A1 Nov. 9, 2017

(30) Foreign Application Priority Data
Nov. 26, 2014 (DE) .................. 10 2014 224 066

(51) Int. Cl.
*B62M 6/50* (2010.01)
*B62M 6/45* (2010.01)
*B62M 6/55* (2010.01)

(52) U.S. Cl.
CPC ................ *B62M 6/50* (2013.01); *B62M 6/45* (2013.01); *B62M 6/55* (2013.01)

(58) Field of Classification Search
CPC ............. B62M 6/50; B62M 6/45; B62M 6/55
(Continued)

(56) References Cited

U.S. PATENT DOCUMENTS 5,505,277 A * 4/1996 Suganuma ............... B62M 6/45
180/206.3
2014/0358349 A1* 12/2014 Okuda ................... B60K 6/445
701/22
(Continued)

FOREIGN PATENT DOCUMENTS

CN 102849168 A 1/2013
CN 102897276 A 1/2013
(Continued)

OTHER PUBLICATIONS

International Search Report for PCT/EP2015/071593, dated Dec. 18, 2015.

*Primary Examiner* — Yazan A Soofi
(74) *Attorney, Agent, or Firm* — Norton Rose Fulbright US LLP; Gerard Messina

(57) ABSTRACT

A vehicle operable by muscle force and/or pedaling force including an electric drive, a control unit for actuating the electric drive, a crankshaft drive; a first detection device for detecting a cycle time across a predefined crank angle, a second detection device for detecting a force applied by a driver; and a third detection device for detecting a first time during which the force applied by the driver lies above a threshold value, or a second time during which the force applied by the driver lies below the threshold value, and the control unit is configured to calculate a quotient of the first time and the cycle time, or a quotient of the second time and the cycle time, or a quotient of the first time and the second time, and the control unit is further configured to control the electric drive as a function of the calculated quotient.

18 Claims, 3 Drawing Sheets

(58) Field of Classification Search
USPC .......................................................... 701/22
See application file for complete search history.

(56) References Cited

U.S. PATENT DOCUMENTS

| | | | | |
|---|---|---|---|---|
| 2015/0136509 A1* | 5/2015 | Tanaka | ..................... | B62M 6/50 |
| | | | | 180/206.3 |
| 2015/0292934 A1* | 10/2015 | Baumgaertner | ......... | B62M 6/50 |
| | | | | 701/22 |
| 2016/0159432 A1* | 6/2016 | Nishikawa | ............... | B62M 6/50 |
| | | | | 701/22 |
| 2016/0297499 A1* | 10/2016 | Ohashi | ..................... | B62M 6/45 |
| 2016/0347407 A1* | 12/2016 | Tsuchizawa | ............. | B62M 6/50 |

FOREIGN PATENT DOCUMENTS

| CN | 102963483 | A | 3/2013 |
|---|---|---|---|
| CN | 103863506 | A | 6/2014 |
| DE | 10243751 | A1 | 6/2003 |
| DE | 102010017742 | A1 | 1/2012 |
| EP | 0569954 | A1 | 11/1993 |
| EP | 2436591 | A1 | 4/2012 |
| EP | 2505477 | A1 | 10/2012 |
| EP | 2604499 | A1 | 6/2013 |
| EP | 2783969 | A1 | 10/2014 |
| JP | H11348867 | A | 12/1999 |
| JP | 2000053071 | A | 2/2000 |

* cited by examiner

VEHICLE HAVING AN ELECTRIC DRIVE, IN PARTICULAR AN ELECTRICAL BICYCLE, AND METHOD FOR OPERATING SUCH A VEHICLE

FIELD OF THE INVENTION

The present invention relates to a vehicle which is operable using muscular force and/or pedaling force, in particular an electrical bicycle; it also relates to a method for operating such a bicycle.

BACKGROUND INFORMATION

High-quality electrical bicycles usually employ torque sensors for sensing a driver torque. If the driver desires support, an electric drive then proportionally amplifies the sensed driver torque. This results in a driving feel that is perceived as natural by the driver since a greater introduction of force takes place simultaneously with a greater support up to a maximum support. More cost-effective electrical bicycles frequently have only a pedal-speed sensor. Here, support by the electric drive is then rendered for the most part at a constant torque. This heavily restricts the metering ability of the motor torque, especially in high support stages. In addition, the patent document DE 102010017742 A1 discusses a method for actuating an electric drive of a bicycle, in which the driver torque is estimated. However, this method is therefore very imprecise so that support by the electric drive may lead to a poor driving feel.

SUMMARY OF THE INVENTION

In contrast, the vehicle, in particular an electrical bicycle, which is able to be operated by motor power and by motor-pedaling power and has the features described herein, has the advantage that a torque sensor is able to be dispensed while support by the electric drive which provides a high-quality driving feel is nevertheless possible. The support by the electric drive is able to be metered with high precision so that an excellent driving feel is achieved for a driver. Because the expensive torque sensor has been dispensed with, the present invention is able to be realized in an especially cost-effective manner. According to the present invention, this is achieved in that the vehicle has an electric drive as well as a control unit for actuating the electric drive. In addition, the vehicle has a crankshaft drive including a first and a second crank. The vehicle is furthermore equipped with a first detection device for detecting a passed-through crank angle of at least one of the cranks; a second detection device for detecting a cycle time at which the crank is moved through the passed-through crank angle; and a third detection device for detecting a time during which a power generated by the driver lies above or below a predefined threshold value. Since it is only detected whether the driver power lies above or below the threshold value, a simple sensor may be used which merely detects whether or not the driver power reaches the threshold value. The control unit is now developed to calculate a quotient of the detected time with regard to the driver force and the cycle time, or the time above the threshold value and the time below the threshold value, and to control the electric drive as a function of the calculated quotient. The quotient is a measure of a driver torque applied by the driver. Of course, it is also possible to determine the quotient from the reverse values. According to the present invention, it is therefore possible to realize a closed-loop control system that does not include a torque sensor. By modifying a selection of the predefined threshold value, it is easily possible to respond to different demands by different vehicle manufacturers. It should be noted that it is naturally also possible for the control unit to calculate the electric drive based on a quotient in which the time interval lies below the threshold value.

The further descriptions herein disclose further developments of the present invention.

In order to improve the accuracy of the actuation of the electric drive, the third detection device for detecting a force applied by the driver may be mounted on the pedal and/or on the crank and/or the crankshaft.

Furthermore, the predefined crank angle may be a fixed value. This makes it possible to develop especially the first detection device for detecting the cycle time for the predefined crank angle in a very simple manner. The predefined crank angle may be an angle for one half of a crank rotation, i.e. 180 degrees. It especially may be that the one half crank rotation is detected between top dead center and bottom dead center of the crankshaft drive. As an alternative, the control unit may also be configured to detect values of the cycle time for a plurality of passed-through crank angles. A mean value of the detected values may then be generated.

Moreover, the control unit may be configured to utilize the acquired values for detecting an uneven pedal operation by the driver, and to notify the driver accordingly. A training function for the driver is thereby able to be provided so that the driver gets close to an optimal circular pedal operation while riding.

In addition, the second detection device may include a spring element for ascertaining a force applied by the driver. For example, the spring element may be provided in such a way that a corresponding signal for the driver torque will be transmitted to the control unit only if the spring element is fully compressed; this signal indicates that the driver is currently exerting a force of a predefined torque that corresponds to a spring constant of the spring element, for example, and thus lies above the threshold value. For as long as the spring element is not fully compressed, the torque applied by the driver lies below the threshold value. The spring constant of the spring element may be variable so that the threshold value is able to be adjusted individually.

Moreover, the electric drive may be operable using a plurality of support stages, and a different predefined threshold value is defined for each support stage. This allows for a clearly better actuation of the electric drive as a function of the respective support stage that is selected by the driver.

It especially may be the case that the vehicle according to the present invention be an electrical bicycle. In addition, the electric drive may be situated in the region of the crankshaft drive. This makes it possible to realize a central motor concept for the bicycle, which offers distinct advantages in comparison with other concepts.

Furthermore, the present invention relates to a method for operating a vehicle that is operable using muscular force and/or pedaling force, in particular an electrical bicycle. The method according to the present invention encompasses the step of detecting a cycle time across a predefined passed-through crank angle, of detecting a force applied by the driver, and of detecting a time during which the force applied by a driver while passing through the crank angle lies above a threshold value. Subsequently, a quotient of the time and the cycle time is calculated and an actuation of the electric drive takes place as a function of the quotient calculated in this manner. It is therefore not necessary to install a torque sensor on the vehicle in order to detect a driver torque. Thus, the advantages available to the vehicle are also achieved by the method of the present invention.

Moreover, a control unit may be provided, which checks whether the ratio between the time and the cycle time lies within a predefined range. An actuation of the electric drive then takes place as a function of the range in which the quotient lies. Very precise metering of the torque of the electric drive is able to be achieved in this way, in particular when the ranges are selected to be relatively small.

In addition, the electric drive may have a plurality of support stages, and a different range is allocated to each support stage.

According to another further refinement of the method of the present invention, the passed-through predefined crank angle is varied. In other words, the crank angle may amount to one half of a crank rotation, for example, or it may also amount to a plurality of consecutive crank rotations.

The crank angle may be varied or adapted while the vehicle is in motion. This makes it possible to provide a learning system so that an optimal support by the electric drive is able to be achieved.

In the following text, an exemplary embodiment of the present invention is described in detail with reference to the drawings.

DETAILED DESCRIPTION

In the following text, an electrical bicycle 1 according to an exemplary embodiment of the present invention is described in detail with reference to FIGS. 1 through 4.

Figure 1:
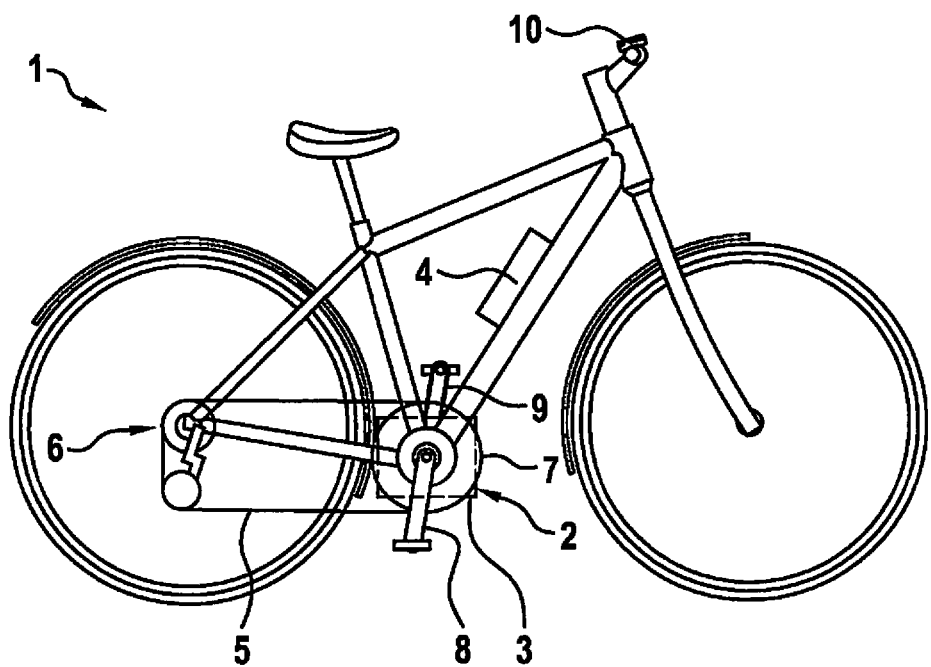
FIG. 1 shows a schematic view of a vehicle according to an exemplary embodiment of the present invention.
Figure 2:
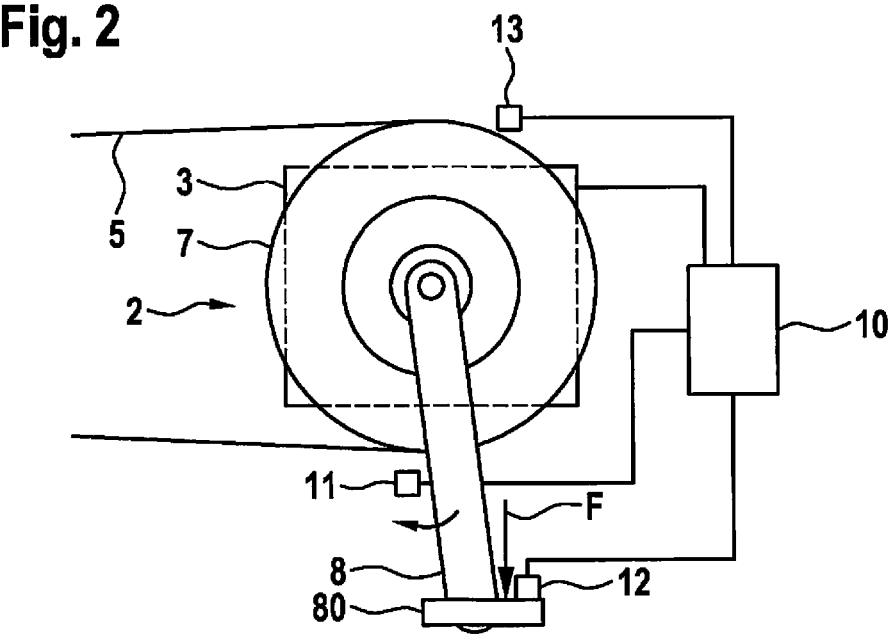
FIG. 2 shows a schematic illustration of the crankshaft drive from FIG. 1.

As is clear from FIG. 1, electrical bicycle 1 includes a crankshaft drive 2 having a first and a second crank 8, 9 as well as an electric drive 3. A storage battery is denoted by reference numeral 4.

Furthermore, a chain ring 7 is provided on the crankshaft drive, with which a chain 5 engages so that a torque is able to be transmitted from chain ring 7 to a pinion on a gear system 6 at the rear wheel of the electrical bicycle.

In addition, electrical bicycle 1 according to the present invention includes a control unit 10. Control unit 10 is connected to electric drive 3 and configured to control electric drive 3, which will be explained in detail in the following text.

Figure 3:
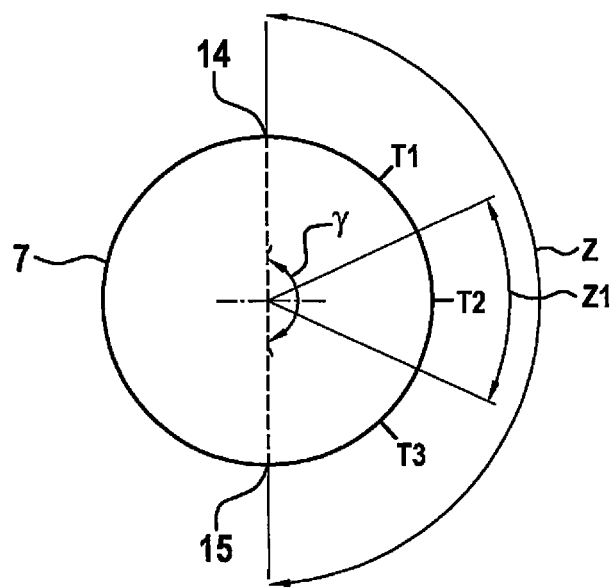
FIG. 3 shows a schematic illustration of a passed-through predefined crank angle.

The electrical bicycle additionally includes a first detection device 11 for detecting a cycle time Z over a predefined crank angle γ of one of the cranks. This is schematically illustrated in FIG. 3, where γ amounts to 180°. In addition, a second detection device 12 for detecting a force F applied by a driver is provided. With the aid of this force, a driver torque applied by the driver is able to be determined. Second detection device 12 is mounted on a pedal 80 of first crank 8. Furthermore, a third detection device 13 is provided, which detects a time during which the force applied by the driver at pedal 80 lies above or below a predefined threshold value S.

Control unit 10 is now configured to calculate a quotient Q; quotient Q is the ratio between first time Z1 during which the driver applies force F above the threshold value, and cycle time Z, which is required by a crank to pass through predefined crank angle γ (Q=Z1/Z).

Control unit 10 is furthermore configured to control the electric drive as a function of calculated quotient Q. According to the present invention, it is therefore possible not to provide a torque sensor on electrical bicycle 1 for detecting a torque M1 applied by a driver. Due to the clever placement of the three detection devices 11, 12, 13 according to the present invention, this may be accomplished without a torque sensor.

Second detection device 12 may be developed as a spring element, for instance. It must then simply be detected whether a force applied by the driver on pedal 80 is sufficient to completely compress the spring element, for example. If this is the case, then force F applied by the driver is greater than a predefined threshold value S, thereby starting the time detection of time Z1 during which force F applied by the driver lies above the threshold value. As soon as the spring element is again no longer fully compressed by the driver, the end point of detected time Z1 has been reached.

Figure 4:
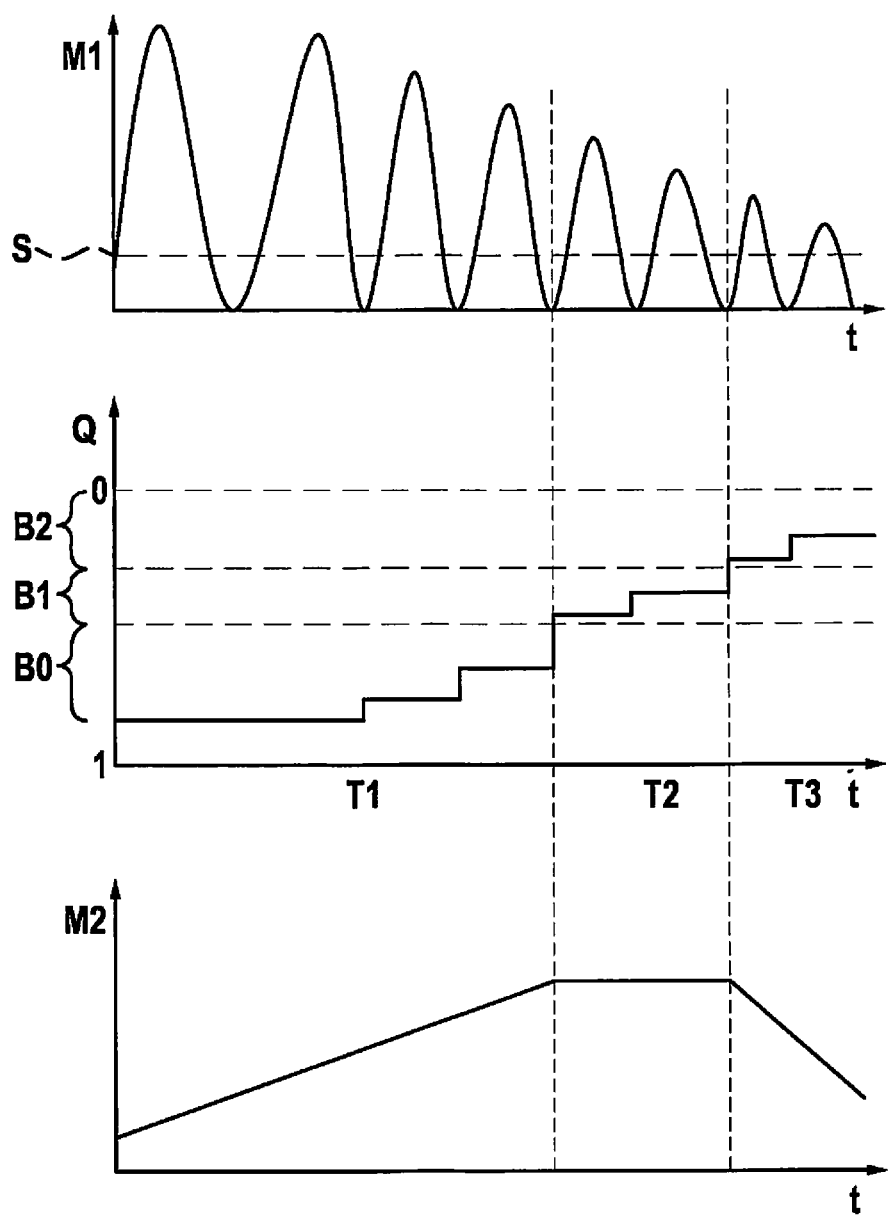
FIG. 4 shows diagrams, which indicate a driver torque, a quotient, and a motor torque over the time.

In the upper diagram in FIG. 4, a natural driver torque M1 is shown over time t, which is approximately sinusoidal. Reference numeral S denotes the threshold value, which is used for ascertaining time Z1 with the aid of third detection device 13.

FIG. 3 schematically shows crankshaft drive 2; passed-through crank angle γ reaches from top dead center 14 to bottom dead center 15 in this case. Here, force F is not yet high enough to exceed threshold value S in the angular ranges identified by T1 and T3. In range T2, on the other hand, force F is greater than predefined threshold value S. According to the present invention, this time span (time Z1), during which force F is greater than threshold value S, is recorded. Furthermore, cycle time Z from top dead center 14 to bottom dead center 15 is recorded as well and related to each other in order to calculate quotient Q (Q=Z1/Z). Then, a control of electric drive 3 takes place on the basis of quotient Q.

The center diagram from FIG. 4 schematically shows quotient Q over time t across one half of a pedal rotation. In range B1, an optimal range is present for the driver, in which sensitive, i.e. unnoticeable, support by electric drive 3 is possible. If quotient Q is too small, motor torque M2 must be increased (range B0), as illustrated in the third diagram from FIG. 4, because a driver torque is too high. If the driver torque is too small (range B2), motor torque M2 is able to be reduced. Motor torque M2 in the bottom diagram of FIG. 4 is shown over the time.

It should be noted that a plurality of pedal rotations rather than one half of a pedal rotation may be analyzed as well. In particular a mean value may be ascertained here and a uniform crank motion by the driver be supported, for instance.

Instead of analyzing time span T2 at crank angle γ, it is naturally also possible to add the two time spans T1 and T3, during which the force of the driver does not exceed the threshold value.

Furthermore, it is also conceivable that a mathematical function such as in the form of an ideally sinusoidal torque characteristic is used as the basis for the reference, through which control unit 10 is able to control electric drive 3.

What is claimed is:

1. A vehicle operable using at least one of a muscle force and a pedaling force, comprising:

an electric drive;

a control unit for actuating the electric drive;

a crankshaft drive having a first crank and a second crank for driving the vehicle;

a first detection device for detecting a cycle time over a predefined crank angle;

a second detection device for detecting a force applied by a driver; and a third detection device for detecting a first time, during which the force applied by the driver lies above a threshold value, or a second time, during which the force applied by the driver lies below the threshold value;

wherein the control unit is configured to calculate a quotient of the first time and the cycle time, or a quotient of the second time and the cycle time, or a quotient of the first time and the second time, and wherein the control unit is configured to control the electric drive as a function of the calculated quotient.

2. The vehicle of claim 1, wherein the second detection device is mounted on at least one of a pedal, one of the cranks, and a crankshaft.

3. The vehicle of claim 1, wherein the predefined crank angle across which the cycle time is detected is a fixed value.

4. The vehicle of claim 1, wherein the control unit is configured to generate values for the cycle time for a plurality of passed-through crank angles.

5. The vehicle of claim 1, wherein the control unit is configured to use the acquired values for detecting an uneven pedal operation and to inform the driver.

6. The vehicle of claim 1, wherein the second detection device includes a spring element.

7. The vehicle of claim 6, wherein a complete compression of the spring element defines the threshold value of the driver torque.

8. The vehicle of claim 1, wherein the electric drive is operable using a plurality of support stages, and wherein a different predefined threshold value is selected for each support stage.

9. A method for operating a vehicle which is operable by at least one of a muscular force and a pedaling force, having an electric drive, a crankshaft drive having a first and a second crank, and a control unit, the method comprising:

detecting a cycle time across a predefined crank angle at the crankshaft drive;

detecting a force applied by a driver;

detecting a first time during which the force applied by the driver lies above a threshold value, or detecting a second time during which the force applied by the driver lies below the threshold value;

calculating a quotient of the first time and the cycle time, or a quotient of the second time and the cycle time, or a quotient of the first time and the second time, the quotient representing a measure of a driver torque, and actuating the electric drive as a function of the calculated quotient.

10. The method of claim 9, wherein the control unit checks whether the quotient falls into a predefined range and actuates the electric drive as a function of the range.

11. The method of claim 9, wherein the electric drive has a plurality of support stages and a different threshold value is allocated to each support stage.

12. The method of claim 9, wherein the predefined crank angle to be passed through is varied during the operation.

13. The vehicle of claim 1, wherein the predefined crank angle across which the cycle time is detected is a fixed value, which is one half of a crank rotation.

14. The vehicle of claim 1, wherein the control unit is configured to generate values for the cycle time for a plurality of passed-through crank angles, the values including a mean value.

15. The vehicle of claim 1, wherein the control unit is configured to use the acquired values for detecting an uneven pedal operation and to inform the driver on a display.

16. The vehicle of claim 1, wherein the vehicle is an electrical bicycle.

17. The vehicle of claim 1, wherein the vehicle is an electrical bicycle.

18. The vehicle of claim 6, wherein the spring element has a variable spring constant, by which a force applied by the driver is able to be ascertained.

* * * * *